3,649,573
SULFUR-CURABLE COMPOSITIONS COMPRISING AMORPHOUS OLEFIN COPOLYMERS AND DIENE RUBBERS
Seimei Yasui, Takatsuki-shi, Masaaki Hirooka, Ibaragi-shi, and Teruo Oshima, Nishinomiya-shi, Japan, assignors to Sumitomo Chemical Company, Ltd., Osaka, Japan
No Drawing. Filed Feb. 11, 1969, Ser. No. 798,448
Claims priority, application Japan, Feb. 20, 1968, 43/10,963
Int. Cl. C08c 9/08; C08f 29/12
U.S. Cl. 260—5      4 Claims

ABSTRACT OF THE DISCLOSURE

A sulfur-curable composition consisting essentially of 95 to 5% by weight of at least one amorphous olefinic copolymer having a main chain consisting essentially of ethylene and at least one α-olefin of 3 to 20 carbon atoms, and having at least one side chain containing hydrocarbon group having at least two acyclic carbon-carbon double bonds, and having 0.08 to 1.2 moles of the said double bonds per 100 g. of the copolymer, and 5 to 95% by weight of at least one diene rubber having at least 0.8 mole of double bonds per 100 g. of the diene rubber. The composition has an increased compatibility between the copolymer and the diene rubber owing to the presence of the unsaturated side chain of the copolymer and a highly improved co-curability.

---

This invention relates to a sulfur-curable composition containing an amorphous olefinic copolymer having ethylene and α-olefin as a main chain and having polyene type side chains, and a diene rubber.

Many attempts have been heretofore made to make an ethylene-propylene copolymer sulfur-curable by copolymerizing ethylene and propylene with various non-conjugated diene compounds, for example, such norbornene compound as dicyclopentadiene, methylene-norbornene and ethylidene-norbornene, or 1,4-hexadiene, methyltetrahydroindene, cyclooctadiene, etc. For instance, a rubber having a considerably high vulcanization speed was obtained by copolymerizing ethylene and propylene with ethylidene-norbornene. However, such copolymer was poor in co-curability with a diene rubber rubber, for example, natural rubber, polyisoprene, polybutadiene, styrene-butadiene copolymer (SBR), nitrile rubber, etc., and consequently its application fields were considerably restricted.

The co-curability with said diene rubber could be improved by enhancing a diene component concentration of the ethylyene-propylene terpolymer, but employment of high concentration of the diene compound tends to result in gelation. Furthermore, when the copolymer contained a large amount of compound having a highly bulky cyclic structure, such as norbornene, the rubber quality itself was unfavorably influenced by such a compound, and use of a large amount of expensive diene compound was also a problem in polymer cost.

The present inventors found that a copolymer obtained by introducing a suitable amount of at least one side chain containing a polyene structure into a main chain consisting essentially of ethylene and such α-olefin as propylene had a high sulfur-curability even when mixed together with a diene rubber, and succeeded in overcoming the drawbacks of said prior art. It is more important that the present inventors found that, even when a relatively small proportion of a polyene structure, for example, not more than 10% by mole of it per mole of monomer unit of the main chain was introduced as at least one side chain, the gelation was hardly brought about and a sulfur-curable rubber was obtained. Furthermore, the present inventors found that, when the polyene structure of the side chain was properly selected, even a copolymer having at least one relatively short side chain, for example, a copolymer having side chains of polyene structure having a molecular weight of not more than 1,000, was considerably fairly sulfur-curable.

Accordingly, one object of the present invention is to provide a novel sulfur-curable composition.

Another object is to provide a process for producing a novel sulfur-curable composition.

A furher object is to provide an article made of a novel sulfur-curable composition.

Other objects will be apparent from the following description.

In order to accomplish these objects, the present invention provides a sulfur-curable composition consisting essentially of 95 to 5% by weight of at least one amorphous olefinic copolymer having a main chain consisting essentially of ethylene and at least one α-olefin of 3 to 20 carbon atoms, and having a side chain containing a hydrocarbon group having at least two acyclic carbon-carbon double bonds, and having 0.08 to 1.2 moles of the said double bonds per 100 g. of the copolymer and 5 to 95% by weight of at least one diene rubber having at least 0.8 mole of double bonds per 100 g. of the diene rubber.

The amorphous olefinic copolymer having at least one polyene structure side chain used in the present invention can be obtained by various methods. For example, such an oligopolymer of butadiene or isoprene as one of the monomer components for copolymerization can be copolymerized with ethylene and α-olefin. Such oligopolymer can be also prepared by polymerizing butadiene or isoprene by various polymerization methods. Further, those obtained by decomposing natural rubber, polyisoprene, polybutadiene, or styrene-butadiene copolymer can be also used, but the oligopolymer of such kind has a considerably low copolymerization reactivity and thus it is relatively difficult to effectively prepare a copolymer.

Further, the desired amorphous olefinic copolymer of the present invention can also be produced by graft-polymerizing radicals with a diene compound, the radicals being obtained by heating an amorphous copolymer of ethylene and α-olefin or a terpolymer of ethylene, α-olefin and a diene compound or by treating it with oxygen or a radical source or by other methods. In such a case, a homopolymer of the diene compound is by-produced or the graft polymer tends to gel, depending upon the conditions. Thus, it is necessary to avoid any occurrence of these phenomena.

Further, an objective amorphous olefinic copolymer can also be produced by introducing a polyenic hydrocarbon group into a copolymer of ethylene and α-olefin, and optionally a diene component, by utilizing such a functional group as halogen introduced by copolymerizing ethylene and α-olefin, and optionally a diene component, together with a monomer having such functional group.

Still further an objective amorphous olefinic copolymer can also be produced by subjecting a halogenated copolymer obtained by reacting a copolymer consisting essentially of ethylene and an α-olefin of 3 to 20 carbon atoms with halogen to Wurtz reaction with an alkali metal adduct of an oligopolymer of such a diene as butadiene or isoprene.

Most effectively, a desired amorphous olefinic copolymer can be produced by copolymerizing ethylene, α-olefin and a norbornene-2 compound having at the fifth position a polyenic hydrocarbon group having at least two acyclic and unconjugated double bonds. The thus produced amorphous olefinic copolymer, wherein the side chain having the double bonds is bonded with the main chain of the copolymer through a bicycloheptene ring, gives preferable results to sulfur-curability of the present composition.

The polyenic side chain of the olefinic copolymer used in the present invention can exert a sufficient effect in an amount of not more than 10% by mole of the side chain per monomer unit of ethylene and α-olefin constituting the main chain, and even 1 to 3% by mole of the side chain is effective. However, a copolymer having much more short side chains may be used, if desired. The side chain must contain at least two acyclic double bonds in the present invention. It is preferable that the side chain contains generally 2 to 100, particularly at least 3, more particularly 4 to 20 double bonds. It is interesting to note that even a copolymer having two unsaturated groups is quite distinguished from the conventional copolymer obtained by using a diene compound. Those having a side chain having a molecular weight of about 200 to 10,000 can be effectively used in the present invention, and even those having a side chain having a molecular weight of generally not more than 2,000, particularly not more than 1,000, have a sufficient effect.

The olefinic copolymer having at least one polyenic side chain used in the present invention contains 0.08 to 1.2 moles of double bonds per 100 g. of the copolymers, and particularly those containing 0.12 to 0.4 mole of the double bonds per 100 g. of the copolymer, are preferable. The amount of double bonds present in the olefinic copolymer is usually determined by measuring an iodine number. The meaning that the iodine value of a copolymer is 10 is that, on assumption that one iodine molecule can be added to one double bond, the copolymer contains 0.039 mole of double bonds per 100 g. of the copolymer. There is no particular restriction to the molecular weight of the olefinic copolymer, but in view of the properties of the copolymer, readiness in processability and other operability and readiness in synthesis, that a copolymer generally having an intrinsic viscosity of 1–5 dl./g. measured at 70° C. in a xylene solution is preferable.

The main chain of the olefinic copolymer used in the present invention consists essentially of ethylene and at least one α-olefin having 3 to 20 carbon atoms, or may contain a diene component if necessary. The composition of the main chain is preferably 5 to 80% by mole of ethylene, and 20 to 95% by mole of α-olefin. The α-olefin used in the present invention is an unsaturated hydrocarbon compound having 3 to 20 carbon atoms, and usually those containing an alkyl, aryl, aralkyl or cycloalkyl group is used at option. Particularly, an α-olefin having a lower alkyl group having 1 to 8 carbon atoms is preferable, and above all propylene and butene-1 are frequently used. That is, an olefinic copolymer containing an amorphous copolymer consisting essentially of ethylene and propylene or butene-1 as a main chain is particularly preferable. More concretely, the α-olefin includes propylene, butene-1, pentene-1, 3-methylbutene-1, hexene-1, 3-methyl-pentene-1, 4,4-dimethylpentene-1, 2-ethylhexene-1, decene-1, octadecene-1,5-phenyl-heptene-1 and vinylcyclobutane. Further, other polyenic compound, particularly a non-conjugated diene compound, can be co-polymerized, if necessary. For example, the non-conjugated diene compound includes 1,4-hexadiene, 5-methyl-4,7,8,9-tetrahydroindene, cyclooctadiene, dicyclopentadiene, methylenenorbornene, methylnorbornadiene, ethylidenenorbornene, and isopropylidenenorbornene.

The diene rubber having at least 0.8 mole of double bonds per 100 g. of the diene rubber used in the present invention includes general elastomers wherein diene compounds are polymerized or copolymerized. For example, such amorphous polymeric substances as natural rubber, polyisoprene, polybutadiene, polychloroprene, styrene-butadiene copolymer, and butadiene-acrylonitrile copolymer can be used in the present invention.

A sulfur-curable composition of the present invention is obtained by mixing at least one amorphous olefinic copolymer mentioned above and at least one diene rubber mentioned above according to an ordinary method.

Sulfur-curable olefinic copolymer consisting essentially of ethylene and α-olefin, particularly propylene, obtained by copolymerizing a diene compound therewith is considerably poor in co-curability with the diene rubber. Particularly, a mixture of 90 to 50% by weight of an olefinic copolymer and 10 to 50% by weight of a diene rubber has considerably low mechanical properties when sulfur-cured. For example, the tensile strength is less than 80 kg./cm.$^2$. On the other hand, the composition containing the olefinic copolymer of the present invention has excellent mechanical properties when sulfur-cured. When the olefinic copolymer and the diene rubber are sulfur-cured, the properties of vulcanized mixture depends upon their mixing proportion and vulcanizing prescription. Thus, the optimum sulfur-curing conditions must be selected.

The present composition can yield a rubber having a tensile strength of at least 100 kg./cm.$^2$, generally more than 120 to 200 kg./cm.$^2$ when sulfur-cured under a suitable condition. When the conventional olenic copolymer having an enhanced diene concentration is used in the vulcanizing operation, there has been such a drawback that gelation tends to take place in the roll operation. On the other hand, the blending operation of the present composition can be generally carried out under such a condition that such gelation does not take place substantially.

In sulfur-curing the present composition, the conventional additive for sulfur-curing can be used at option. For the conventional olefinic copolymer having a low diene concentration, the vulcanizing prescription for the diene rubber has been inappropriate, but for the present composition, it is possible to use the prescription for the diene rubber or similar prescription therefor, depending upon the degree of unsaturation. However, it is generally preferable to select an optimum prescription and vulcanizing condition, depending upon the mixing proportion and rubber characteristics. Further, a suitable antioxidant or other additive can be added to the present composition, if required.

The present invention will be explained hereunder in detail, referring to examples, but the present invention is not restricted only to these examples.

EXAMPLE 1

A 2-norbornene derivative containing an isoprene oligopolymer bonded at the 5th position was synthesized by reacting 5-bromomethyl-2-norbornene, metallic sodium and isoprene. The derivative had a mean molecular weight of 500, and it was recognized that 5 isoprenes were bonded as a side chain on average. The 2-norbornene derivative, ethylene and propylene were subjected to copolymerization in a reactor, to which a gaseous mixture of 40% by mole of ethylene and 60% by mole of propylene was led, using n-heptane as a solvent in the presence of ethylaluminum sesquichloride and vanadyl trichloride. The intrinsic viscosity of the copolymer measured at 70° C. in a xylene solution was 1.42 dl./g. and the iodine number was 61.9. The copolymer was a rubber-like copolymer having a main chain of ethylene and propylene units and a side chain of five isoprene units on average. 75 parts by weight of said copolymer was mixed with 25 parts by weight of commercially-available styrene-butadiene copolymer rubber (SBR), and a compound was prepared according to the following prescription.

| | Parts by weight |
|---|---|
| Ethylene-propylene terpolymer | 75 |
| SBR | 25 |
| β-Phenylnaphthylamine | 1 |
| Stearic acid | 1 |
| Zinc oxide | 5 |
| HAF carbon black | 50 |
| Sulfur | 1.5 |
| Tetramethylthiuram sulfide | 1.5 |
| Mercaptobenzothiazole | 0.5 |

The rubber obtained by press-vulcanizing said compound at 150° C. for 10 minutes had a tensile strength of 157 kg./cm.² and elongation of 220%.

For comparison, a compound was prepared using an ethylene-propylene terpolymer (intrinsic viscosity: 2.12 and iodine number: 13.7) containing 5-ethylidene-2-norbornene as the third component in place of said ethylene-propylene terpolymer, and the rubber likewise obtained by press vulcanization had a tensile strength of 70 kg./cm.² and elongation of 290%.

EXAMPLE 2

An ethtylene-propylene copolymer was synthesized in the similar manner as in Example 1, using 5-oligobutadienyl-2-norbornene having a mean molecular weight of 872 obtained by reacting 5-chloro-2-norbornene with oligobutadiene sodium. The intrinsic viscosity of the copolymer was 2.75 dl./g. and the iodine number was 108. A compound was prepared from said ethylene-propylene terpolymer and natural rubber (pale crepe) according to the following prescription:

| | Parts by weight |
|---|---|
| Ethylene-propylene terpolymer | 80 |
| Natural rubber | 20 |
| β-Phenylnaphthylamine | 1 |
| Stearic acid | 1 |
| Zinc white | 5 |
| HAF carbon black | 50 |
| Sulfur | 1.5 |
| Zinc diethyldithiocarbamate | 1.5 |
| Mercaptobenzothiazole | 0.5 |

The rubber obtained by press-vulcanizing said compound at 160° C. for 40 minutes had a tensile strength of 120 kg./cm.² and elongation of 260%.

For comparison, a compound was prepared using an ethylene-propylene terpolymer containing 1,4-hexadiene as the third component and natural rubber, and the rubber likewise obtained by press vulcanization had a tensile strength of 34 kg./cm.².

EXAMPLE 3

Copolymerization of ethylene and propylene was carried out using n-heptane as a solvent and diethylaluminum chloride and vanadyl trichloride as a catalyst, whereby a copolymer having an intrinsic viscosity of 4.04 dl./g. and propylene content of 33.7% by mole was obtained. 30 g. of the thus obtained copolymer was chlorinated in carbon tetrachloride and further subjected to Wurtz reaction with oligobutadiene sodium, whereby the oligobutadiene was introduced as a side chain and 36.5 g. of graft copolymer was obtained. The thus obtained ethylene-propylene graft copolymer was compounded according to the following prescription.

| | Parts by weight |
|---|---|
| Ethylene-propylene graft copolymer | 80 |
| Natural rubber | 20 |
| β-Phenylnaphthylamine | 1 |
| Stearic acid | 1 |
| Zinc white | 5 |
| HAF carbon black | 50 |
| Sulfur | 1.5 |
| Tetramethylthiuram disulfide | 1.5 |
| Mercaptobenzothiazole | 0.5 |

The rubber obtained by press-vulcanizing said compound at 160° C. for 40 minutes had a tensile strength of 185 kg./cm.² and elongation of 280%.

What we claim is:

1. A sulfur-curable composition comprising about 95 to 5% by weight of at least one amorphous olefinic copolymer, having, as a main chain, ethylene units and at least one α-olefin unit having 3 to 20 carbon atoms and having at least one side chain containing at least one polyenyl group which contains 2 to 100 acyclic carbon-carbon double bonds and has a molecular weight of 200 to 10,000, and having 0.08 to 1.2 moles of said double bonds per 100 g. of the copolymer, in which the copolymer is produced by copolymerizing ethylene, at least one α-olefin having 3 to 20 carbon atoms and at least one 2-norbornene compound having at the 5-position thereof a polymer of butadiene or isoprene having 2 to 100 carbon-carbon double bonds or produced by reacting an alkali metal adduct of an oligo-polymer of butadiene or isoprene with a halogenated copolymer of ethylene and at least one α-olefin of 3 to 20 carbon atoms; and 5 to 95% by weight of at least one diene rubber having at least 0.8 mole of double bonds per 100 g., selected from the group consisting of natural rubber, polyisoprene, polybutadiene, polychloroprene, styrene-butadiene copolymer and butadiene-acrylonitrile copolymer.

2. A sulfur-curable composition comprising about 95 to 5% by weight of at least one amorphous olefinic copolymer having, as a main chain, ethylene units and at least one α-olefin unit having 3 to 20 carbon atoms and having at least one side chain containing at least one polyenyl group which contains 2 to 100 acyclic carbon-carbon double bonds and has a molecular weight of 200 to 10,000, and having 0.08 to 1.2 moles of said double bonds per 100 g. of the copolymer, in which the copolymer is produced by copolymerizing ethylene, at least one α-olefin having 3 to 20 carbon atoms and at least one 2-norbornene compound having at the 5-position thereof a polymer of butadiene or isoprene having 2 to 100 carbon-carbon double bonds; and 5 to 95% by weight of at least one diene rubber having at least 0.8 mole of double bonds per 100 g., selected from the group consisting of natural rubber, polyisoprene, polybutadiene, polychloroprene, styrene-butadiene copolymer and butadiene-acrylonitrile copolymer.

3. A sulfur-curable composition comprising about 95 to 5% by weight of at least one amorphous olefinic copolymer produced by reacting an alkali metal adduct of an oligo-polymer of butadiene or isoprene with a halogenated copolymer obtained by reacting a copolymer of ethylene and at least one α-olefin of 3 to 20 carbon atoms with halogen in which said oligo-polymer contains 2 to 100 acyclic carbon-carbon double bonds and has a molecular weight of 200 to 10,000, and having 0.08 to 1.2 moles of said double bonds per 100 g. of the copolymer; and 5 to 95% by weight of at least one diene rubber having at least 0.8 mole of double bonds per 100 g., selected from the group consisting of natural rubber, polyisoprene, polybutadiene, polychloroprene, styrene-butadiene copolymer and butadiene-acrylonitrile copolymer.

4. A process for producing a sulfur-curable composition, which comprises mixing about 95 to 5% by weight of at least one amorphous olefinic copolymer having, as a main chain, ethylene units and at least one α-olefin unit having 3 to 20 carbon atoms and having at least one side chain containing at least one polyenyl group which contains 2 to 100 acyclic carbon-carbon double bonds and has a molecular weight of 200 to 10,000, and having 0.08 to 1.2 moles of said double bonds per 100 g. of the copolymer, in which the copolymer is produced by copolymerizing ethylene, at least one α-olefin having 3 to 20 carbon atoms and at least one 2-norbornene compound having at the 5-position thereof a polymer of butadiene or isoprene having 2 to 100 carbon-carbon double bonds or produced by reacting an alkali metal adduct of an oligo-polymer of butadiene or isoprene with a halogenated copolymer of ethylene and at least one α-olefin of 3 to 20 carbon atoms with 5 to 95% by weight of at least one diene rubber having at least 0.8 mole of double bonds per 100 g., selected from the group consisting of natural rubber, polyisoprene, polybutadiene, polychloroprene, styrene-butadiene copolymer and butadiene-acrylonitrile copolymer.

References Cited
UNITED STATES PATENTS
3,492,370　1/1970　Wirth _____ 260—5 X
3,494,983　2/1970　Diem _____ 260—876 X MURRAY TILLMAN, Primary Examiner H. W. ROBERTS, Assistant Examiner U.S. Cl. X.R.

260—79.5 C, A, B, P, 80.78, 876 R, 877, 878 R, 889